Figure 1:
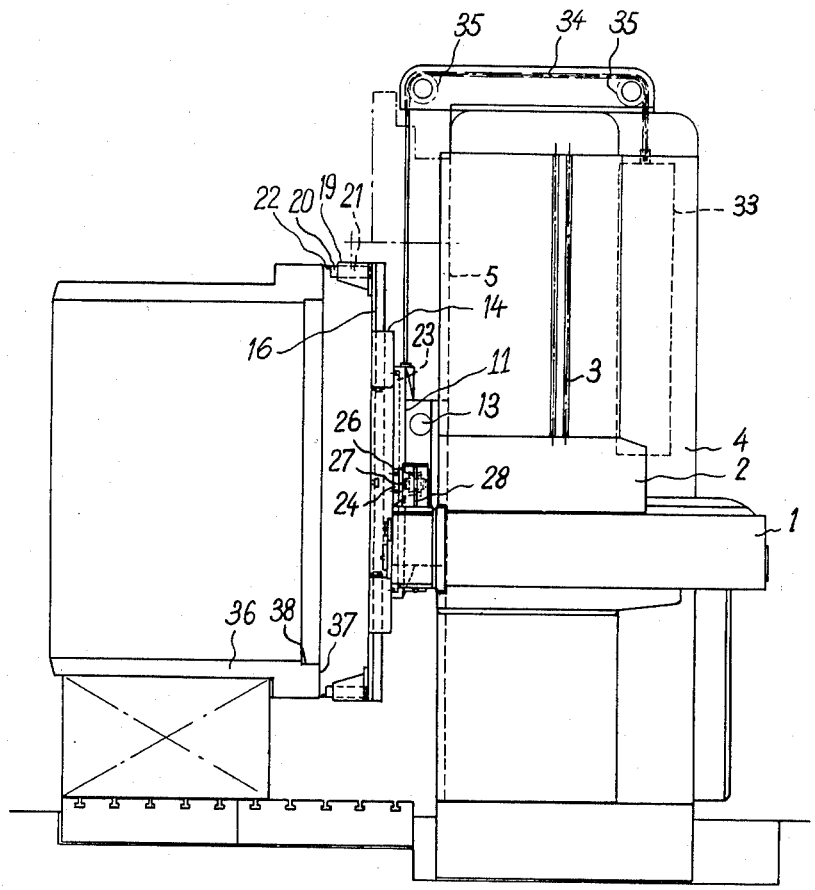

United States Patent Office 3,251,272
Patented May 17, 1966

3,251,272
BORING AND MILLING MACHINE PROVIDED WITH SURFACING AND BORING DEVICE FOR VERY LARGE WORKPIECES
René Deflandre, Paris, France, assignor to Societe Derefa, Etablissement pour le Developpement, Recherches et Fabrications Industrielles, Vaduz, Liechtenstein
Filed Mar. 1, 1965, Ser. No. 435,996
Claims priority, application France, Mar. 10, 1964, 966,735
4 Claims. (Cl. 90—11)

As is known, drilling and milling machines are generally fitted with a face plate, fixed either on the spindle, or on the spindle carrying sheath, or even on a support comprising roller bearings concentric to said latter support.

It moves vertically with the pin-carrying head stock and horizontally with the spindle or with the sheath if the head stock of the machine is, itself, movable horizontally. The general dimensions of these plates naturally depend upon those of the head stock.

The weight of the plate in particular is limited by the power of the usual driving motors provided for vertical and horizontal displacements of the head stock.

Its capacity so far as cutting diameter is concerned depends upon the diameter of the driving members, upon the reduction gearing of the transmission and thus upon the available torque.

In other words, the face plate for a drilling/milling machine head stock of the present known type can only be of a certain maximum diameter which can only be exceeded by a small amount, otherwise the quality and accuracy of the machining carried out will suffer.

Now, it occurs more and more frequently, particularly in recent constructions in nuclear industry, that very large parts have surfaces or bores themselves having very large diameters.

The largest drilling and milling machines at present constructed are not fitted with surface plates suitable for such equipment, because the dimensions required would necessitate head stocks of prohibitive size.

It becomes necessary to carry out the machining on large-capacity vertical lathes, which firstly presents the disadvantage of necessitating very difficult urnings over of the part, the support surface of which must be previously machined and, secondly, of having to transport the part to a drilling/milling machine in order to effect the actual machining appropriate to this machine.

The present invention has for an object improving known drilling/milling machines so as to enable them to have a surface plate suitable for work pieces of the largest dimensions, as soon as the capacity of their normal surface plate is exceeded.

Accordingly, the invention consists in a machine tool comprising a vertical pillar, a head stock for said machine mounted for movement on said pillar, a bed plate mounted for movement along the front surface of said pillar, independently of said head stock, a plate rotatably secured to said bed plate, and at least one carriage for carrying a tool, mounted for movement on said rotatable plate.

Figure 2:
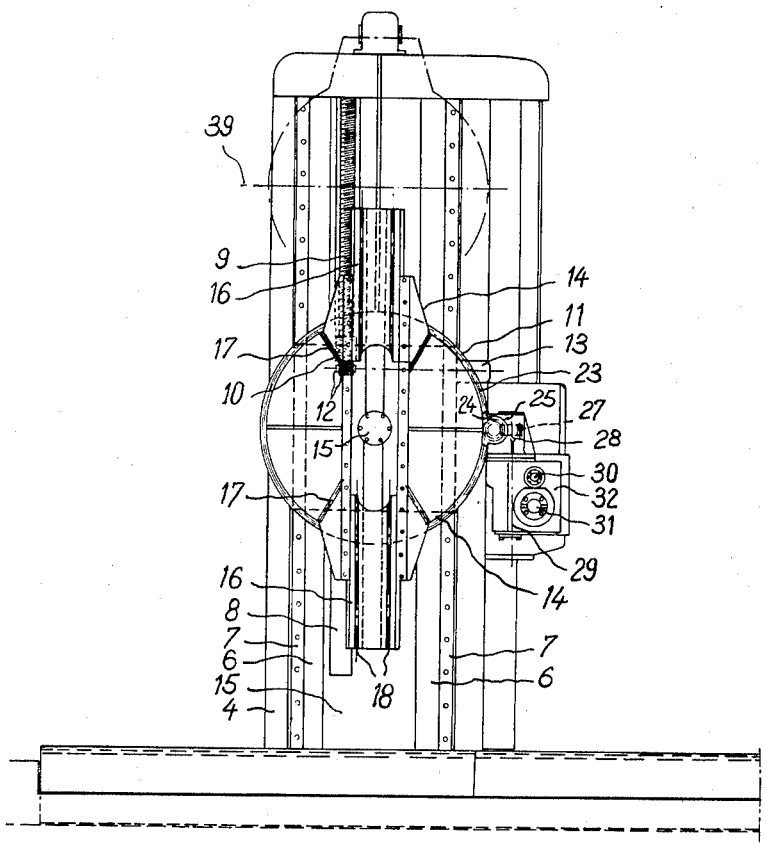
Figure 3:
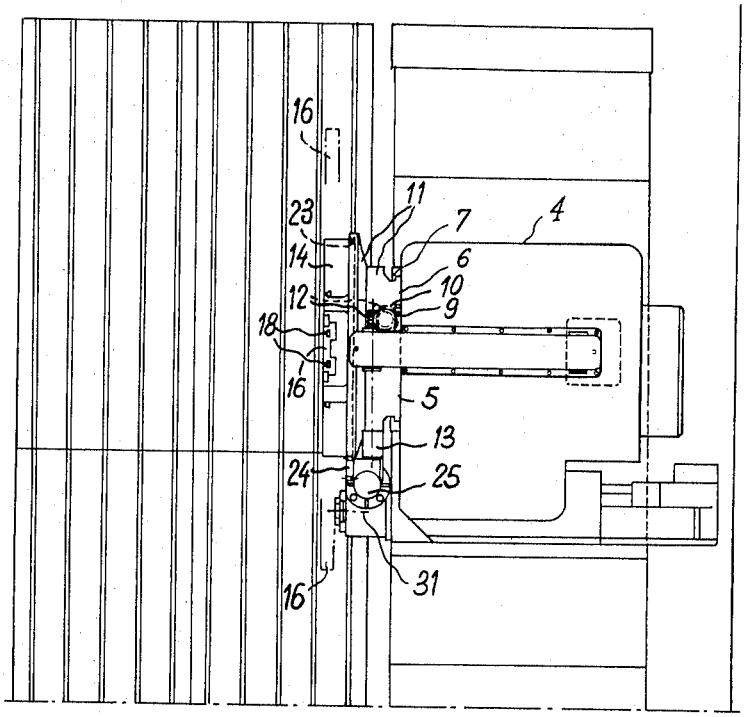

Other characteristics and advantages of the present invention will appear in the course of the description which follows and after examining the accompanying drawings in which one embodiment of the invention has been diagrammatically shown, solely by way of example, and in which:

FIGURE 1 shows an elevation of a drilling and milling machine, to which the invention is applied, FIGURE 2 shows a side view of FIGURE 1, and FIGURE 3 shows a plan view thereof.

Referring now to the drawings, the drilling/milling machine shown comprises a spindle carrying head stock 1, which, in the embodiment, is movable horizontally in a direction parallel to the direction of the spindle on a bed plate 2 which can be raised and lowered by means of a control screw 3, along a vertical pillar 4 of the machine.

However, it must be understood that the invention which will now be described, is also applicable to drilling/milling machines which do not comprise a spindle-carrying carriage movable in the direction of the pin, but a head stock simply movable in a direction perpendicular to the pin, and generally in a vertical direction.

In accordance with the invention, the front surface 5 of the vertical pillar 4 is provided with two sliding surfaces 6 (see FIGURE 2), two strips 7 and a central guide 8 threaded at its upper part 9. The guide is constituted by an assembly of rectangular plates placed end to end. The plates 7 are not threaded, whereas the plates 8 are. The threading of these plates fixed on the vertical pillar 4 is female (part of a nut) which a short screw 10 secured to or integral with a bed plate 11 (see FIGURE 3) engages. The screw 10 is controlled by endless worm gear 12 connected to the shaft of a motor 13 mounted on the bed plate 11 which may thus move vertically along the pillar 4.

This bed plate 11 serves as a support for a plate 14 rotatable about a pivot 15 shown diagrammatically (see FIGURE 2).

Two carriages 16 are movable along the plate 14 which is also provided with T-shaped grooves 17 for fixing boring bars of large diameter. In FIGURE 1, the position of the carriages 16 is shown by dotted lines, said carriages being uncovered when, in consequence of the rotation of the plate 14 about its pivot axis 15, they pass nearest the nose of the spindle 31.

T-shaped grooves 18 locate two tool carriers 19 which comprise a body 20 movable along its axis 21 and fitted with a tool 22 (see FIGURE 1).

The means for longitudinally driving the carriages 16 and the body 20 are not shown on the drawing, since they are of known kind and consequently do not come within the scope of the invention.

The plate 14 is provided with a ring 23 with which a pinion 24, supported by a casing 25 secured to or integral with the head stock 1, engages. On the same axis as the pinion 24 is fixed a hollow wheel 26 which is moved by an endless screw 27 on a shaft shown by its axis 28 on FIGURES 1 and 2.

This shaft is connected to a vertical spindle 29 which is rotatable by the motor of the head stock 1 by means of a transmission comprising horizontal spindles 30 and 31.

The casing 25 is preferably located on the lower part of the head stock so as not to interfere with the assembly of the tools on the horizontal spindles 30 and 31, as would be the case if the movement took place on one of these spindles by fixing the casing on the front surface 32 of the head stock. Such a solution would, however, be within the ambit of the present invention, as well as an arrangement in which the plate is controlled in rotation by means of a gear-reduction drive independent of the head stock 1 and fixed on the bed plate 11.

The plate 14 and the bed plate 11 are balanced by a counterweight 33 placed within the pillar 4, the connecting cable 34 of which weight passes over two pulleys 35, shown diagrammatically.

The plate according to the invention serves to machine parts such as that shown at 36 in FIGURE 1, i.e. parts having large dimensions, for example, for operating on the surface of the part 37 or for boring the part 38.

When the plate is not used, it is preferably moved to the upper part of the pillar 4, its axis being located in position 39 (see FIGURE 2).

We claim:

1. A machine tool comprising a vertical pillar, a head stock for said machine mounted for movement on said pillar, a bed plate mounted for movement along the front surface of said pillar, independently of said head stock, a plate rotatably secured to said bed plate, and at least one carriage for carrying a tool, mounted for movement on said rotatable plate.

2. A machine tool according to claim 1 and, comprising further, a spindle carried by said head stock, a motor for driving said spindle, a toothed ring on said rotatable plate, and a pinion kinematically connected to said motor, said pinion being operatively engageable into said toothed ring to rotate said rotatable plate.

3. A machine tool compirsing a vertical pillar, a head stock for said machine mounted for movement on said pillar, a bed plate mounted for movement along the front surface of said pillar, independently of said headstock, a translation control mounted on said machine, a spindle carried by said headstock, said translation control being independent of said spindle-carrying head stock, means for controlling said bed plate from said translation control, a plate rotatably secured to said bed plate, and at least one carriage for carrying a tool, mounted for movement on said rotatable plate.

4. A machine tool according to claim 3 wherein the front surface of said pillar is grooved to receive said bed plate and comprising further, a guide on said front surface of said pillar, said guide comprising a female-threaded member, a motor, and a screw connected kinematically to said motor, said screw being engaged in said female-threaded member.

No references cited.

WILLIAM W. DYER, JR., *Primary Examiner.*
GERALD A. DOST, *Assistant Examiner.*